United States Patent
Lin et al.

(10) Patent No.: US 6,246,571 B1
(45) Date of Patent: Jun. 12, 2001

(54) COMPUTER ENCLOSURE FOR MOUNTING AN ELECTRONIC DEVICE

(75) Inventors: Wan-Cheng Lin, Pen-Chiao (TW); Li-Yuan Gan, Cheng-Do (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/412,183

(22) Filed: Sep. 30, 1999

(30) Foreign Application Priority Data

Oct. 27, 1998 (TW) ................................................ 87217736

(51) Int. Cl.$^7$ ................................................... G06F 1/16
(52) U.S. Cl. ........................ 361/683; 361/726; 312/223.1
(58) Field of Search .................................... 361/683, 724, 361/725, 726, 727; 312/223.1, 228.1, 249.1

(56) References Cited

U.S. PATENT DOCUMENTS

| | | | |
|---|---|---|---|
| 4,964,017 | * 10/1990 | Jindrick et al. | 361/390 |
| 5,406,453 | * 4/1995 | Cusato et al. | 361/733 |
| 6,052,281 | * 4/2000 | Hardt et al. | 361/690 |
| 6,055,152 | * 4/2000 | Feleman et al. | 361/683 |
| 6,061,966 | * 5/2000 | Nelson et al. | 312/223.1 |

* cited by examiner

*Primary Examiner*—Leo P. Picard
*Assistant Examiner*—Hung Van Duong
(74) *Attorney, Agent, or Firm*—Wei Te Chung

(57) ABSTRACT

A computer enclosure includes a rear panel, a fixing bracket attached to the rear panel, and a bridge mounted to the fixing bracket. The rear panel defines an opening therein. The fixing bracket includes first and second side walls opposite each other to define a receiving space therebetween in communication with the opening in the rear panel adapted for receiving an electronic device therein. The bridge includes first and second ends respectively connected to the first and second side walls of the fixing bracket for positioning and fastening the electronic device.

14 Claims, 5 Drawing Sheets

COMPUTER ENCLOSURE FOR MOUNTING AN ELECTRONIC DEVICE

BACKGROUND OF THE INVENTION

1. Field of the Invention

The present invention relates to a computer enclosure, and particularly to a computer enclosure having a fixing bracket for securely mounting an electronic device, such as a power supply.

2. Description of Prior Art

Low-voltage direct current power is required for electronic devices/elements in a computer, such as a mother board or a hard disk drive. A power supply is often mounted in a computer enclosure for converting alternating current to direct current and supplying the direct current to the computer.

Referring to FIG. 1, a conventional computer enclosure 100 adapted for mounting a power supply 102 includes a rear panel 104 which forms an opening 106 at a top portion thereof to expose the power supply 102. A supporting plate 108 is stamped in the enclosure and extends from an edge of the opening 106 for supporting the power supply 102 thereon. Four holes 110 are defined proximate the opening 106 for extension of bolts (not shown) to fix the power supply 102. However, when attached to or detached from the computer enclosure 100, the power supply 102 must be supported by hand. Thus, assembly of the power supply 102 requires dexterity.

SUMMARY OF THE INVENTION

Accordingly, an object of the present invention is to provide a computer enclosure having a bridge for facilitating the positioning and fastening of a power supply.

Another object of the present invention is to provide a computer enclosure having a bridge for mounting electronic devices.

To fulfil the foregoing objects, a computer enclosure of the present invention comprises a rear panel, a fixing bracket attached to the rear panel, and a bridge which attaches to the fixing bracket. The rear panel defines an opening therein. The fixing bracket includes first and second side walls opposite each other to define a receiving space therebetween in communication with the opening in the rear panel adapted for receiving an electronic device therein. The bridge includes first and second ends respectively connected to the first and second side walls of the fixing bracket for positioning and fastening the electronic device.

BRIEF DESCRIPTION OF THE DRAWINGS

Other objects and advantages of the present invention will be understood from the following description of a computer enclosure according to a preferred embodiment of the present invention shown in the accompanying drawings, in which.

DETAILED DESCRIPTION OF THE PREFERRED EMBODIMENT

Figure 1:
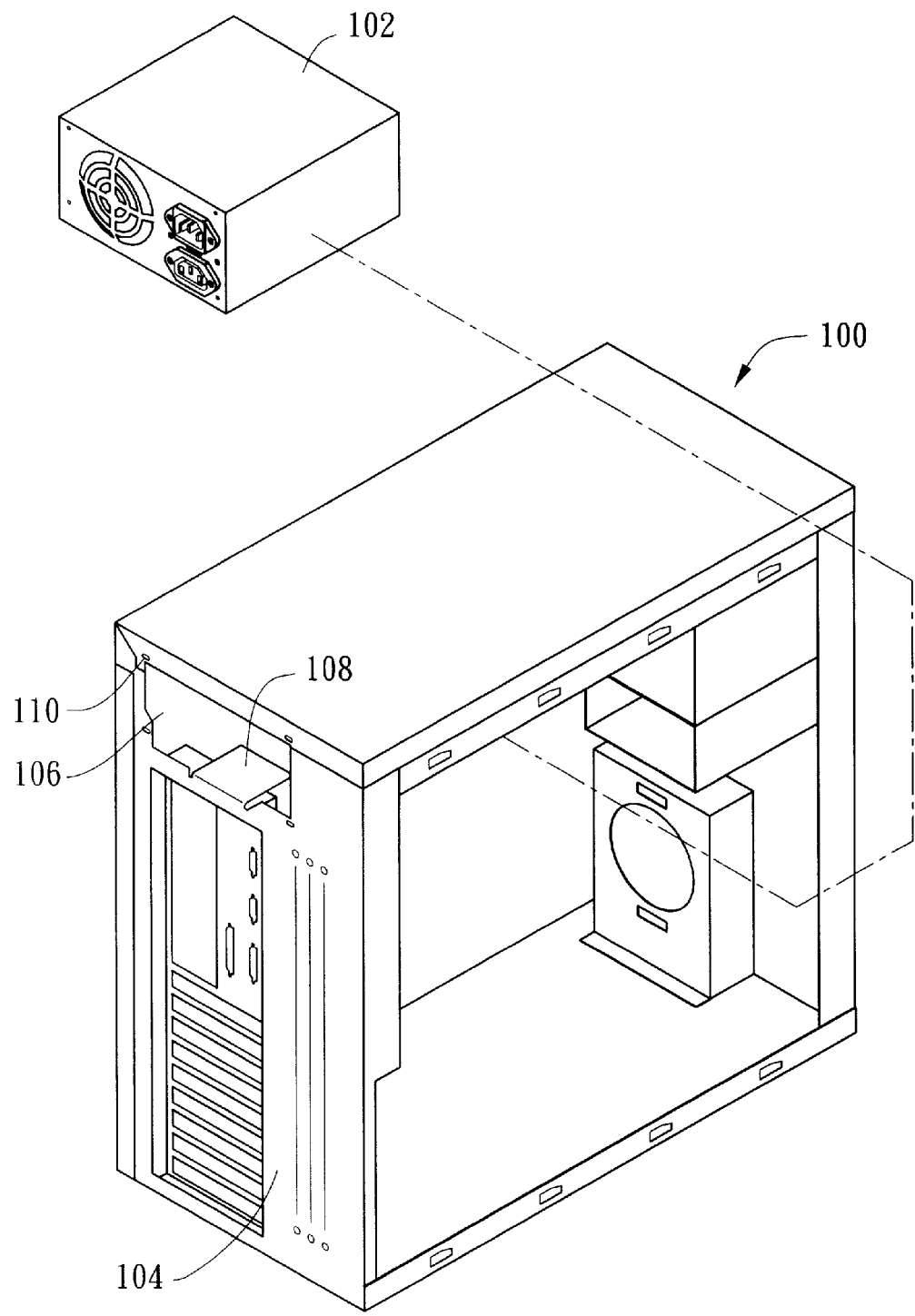
FIG. 1 is an exploded view of a conventional computer enclosure.
Figure 2:
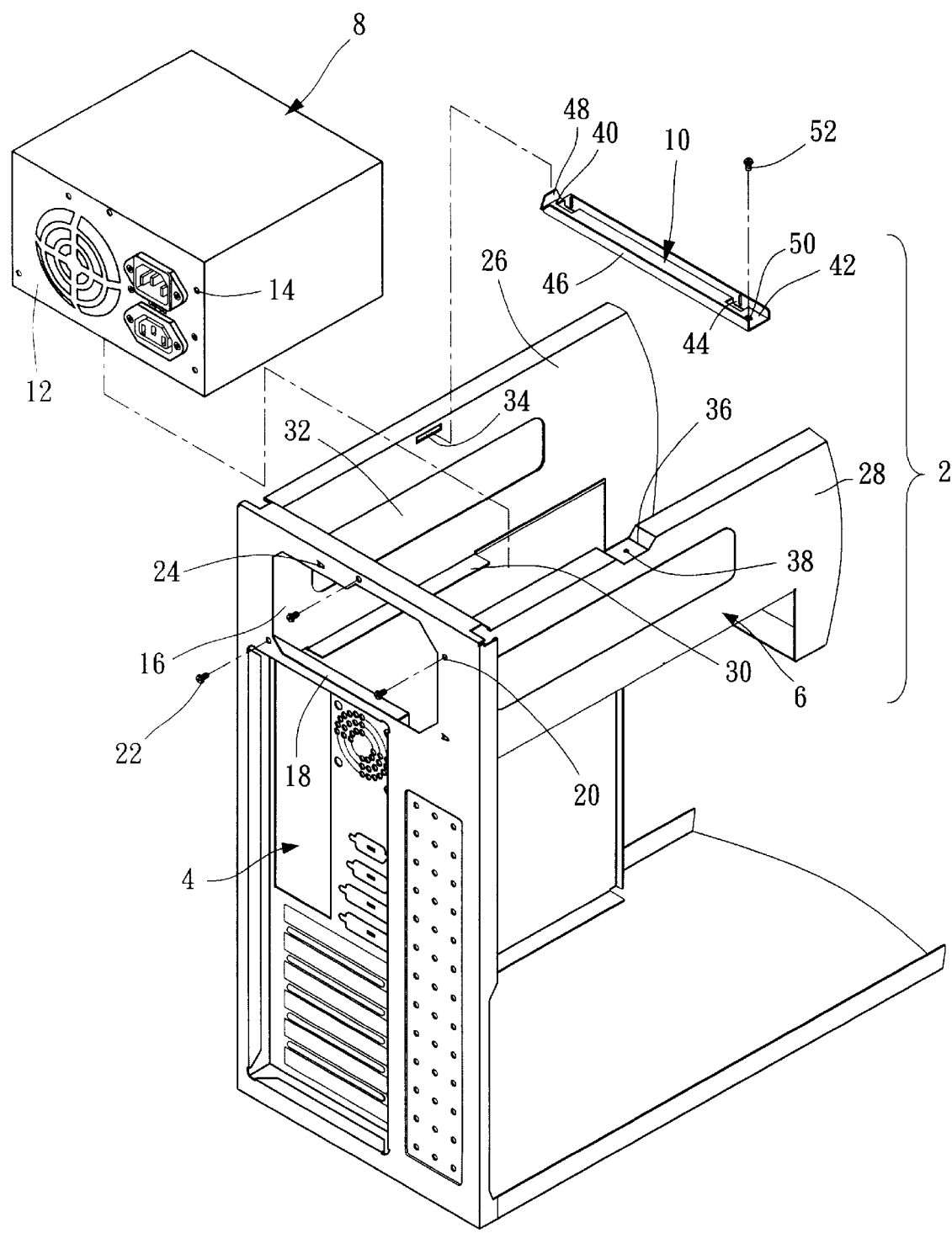
FIG. 2 is an exploded view of a computer enclosure embodying the concepts of the present invention and a power supply to be attached thereto.
Figure 3:
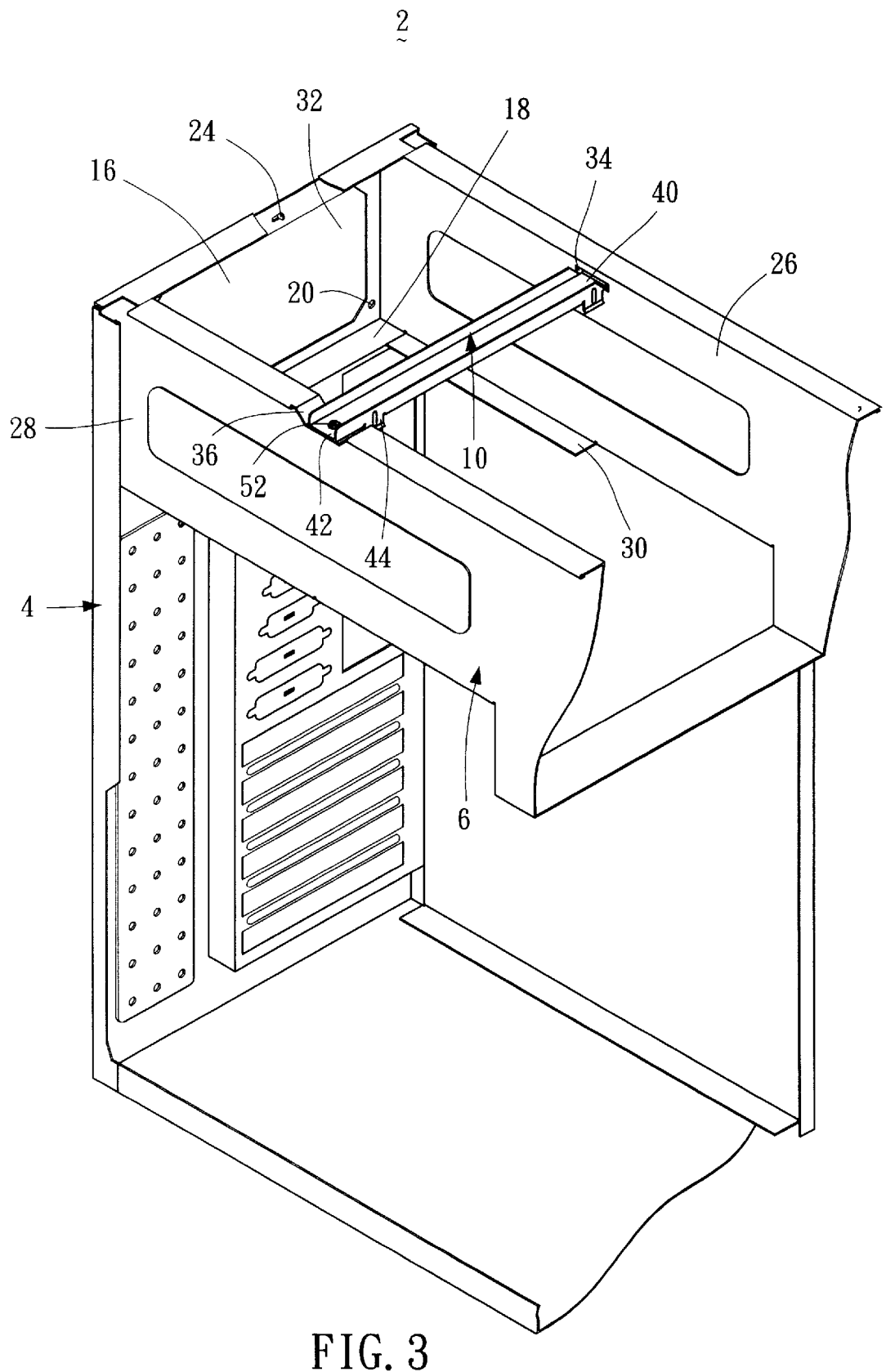
FIG. 3 is a partial, assembled view of the computer enclosure of FIG. 2.

Referring to FIGS. 2 and 3, a computer enclosure 2 in accordance with the present invention comprises a rear panel 4, a fixing bracket 6 for receiving a power supply, such as a switching power supply (SPS) 8, and a bridge 10. The power supply 8 includes a rear wall 12 which forms screw holes 14 therein. An opening 16 is formed at a top portion of the rear panel 4 to expose the rear wall 12 of the power supply 8. A step 18 is formed below and proximate a lower edge of the opening 16 for supporting the power supply 8. Three holes 20 are formed in the rear panel 4 around the opening 16 for the extension of three bolts 22 that threadedly engage with the corresponding screw holes 14 of the power supply 8 for securely mounting the power supply 8. Two latches 24 are stamped on the rear panel 4 proximate the opening 16 for engaging with the corresponding holes 14 to properly position the power supply 8.

The fixing bracket 6 is attached to the top portion of the rear panel 4. The fixing bracket 6 includes a first side wall 26 and a second side wall 28 opposite each other. Inner surfaces of the first and the second side wall 26, 28 each form a supporting flange 30 for supporting the power supply 8. The supporting flanges 30 and the step 18 are at a same height for stably supporting the power supply 8. A receiving space 32 is defined between the first and second side walls 26, 28 and the supporting flanges 30 in communication with the opening 16 of the rear panel 4. A slot 34 is defined in the first side wall 26 proximate a top edge thereof. A recess 36 is defined in a top edge of the second side wall 28. A threaded aperture 38 is defined at the center of a bottom of the recess 36.

The bridge 10 comprises an elongated body having first and second ends 40, 42 and a pair of fingers 44 extending downwardly therefrom respectively proximate the first and the second ends 40, 42. A pair of longitudinal ribs 46 is formed along opposite edges of the bridge 10 for mechanically reinforcing the bridge 10. A tongue 48 extends upwardly from the first end 40 of the bridge 10 for inserting into the slot 34 of the first side wall 26 of the fixing bracket 6. An aperture 50 is formed at the second end 42 of the bridge 10 for the extension of a bolt 52 that threadedly engages with the threaded aperture 38 of the second side wall 28 of the fixing bracket 6 when the second end 42 of the bridge 10 is received in the recess 36 of the fixing bracket 6.

Figure 4:
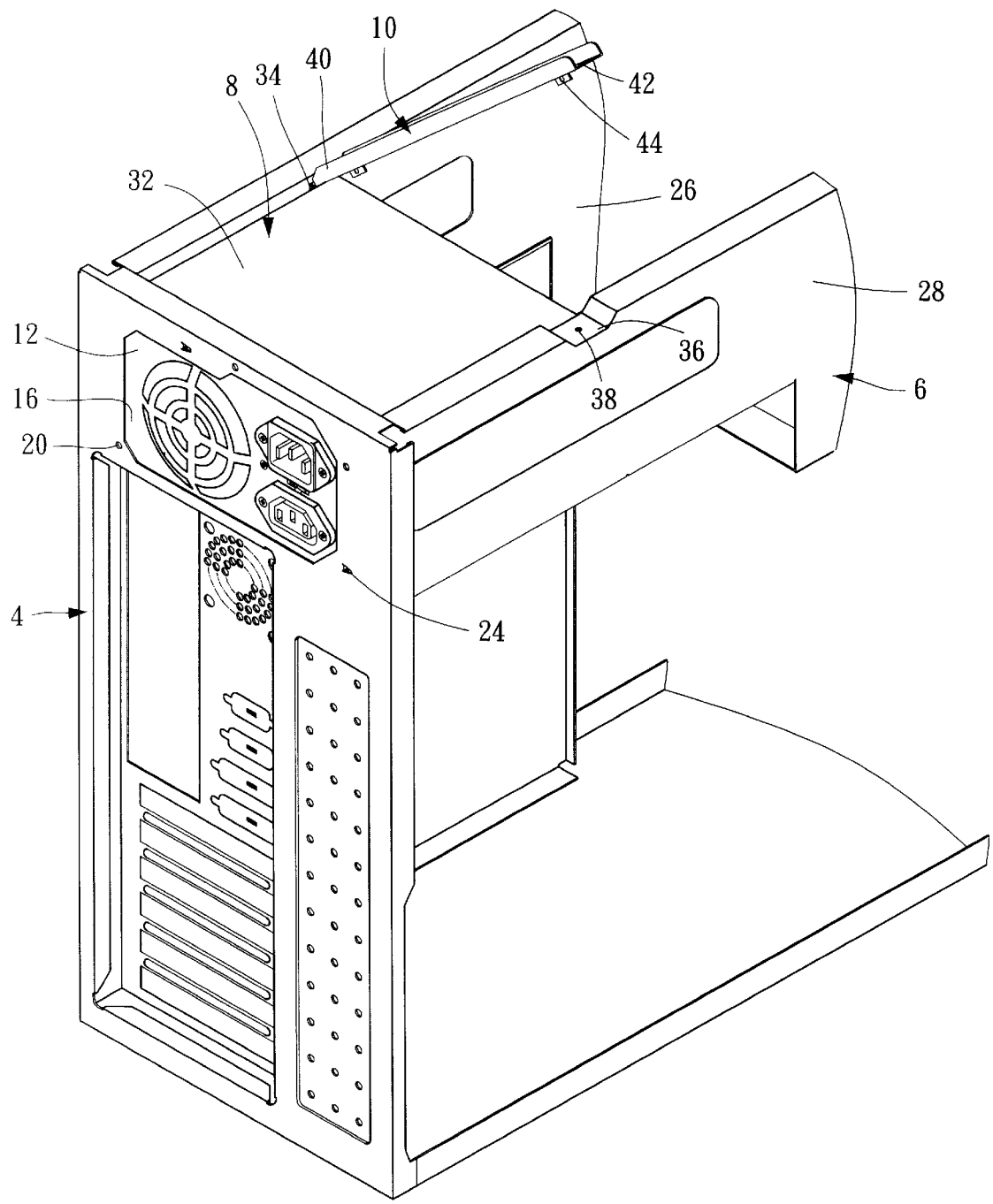
FIG. 4 is a partially assembled view of FIG. 2.
Figure 5:
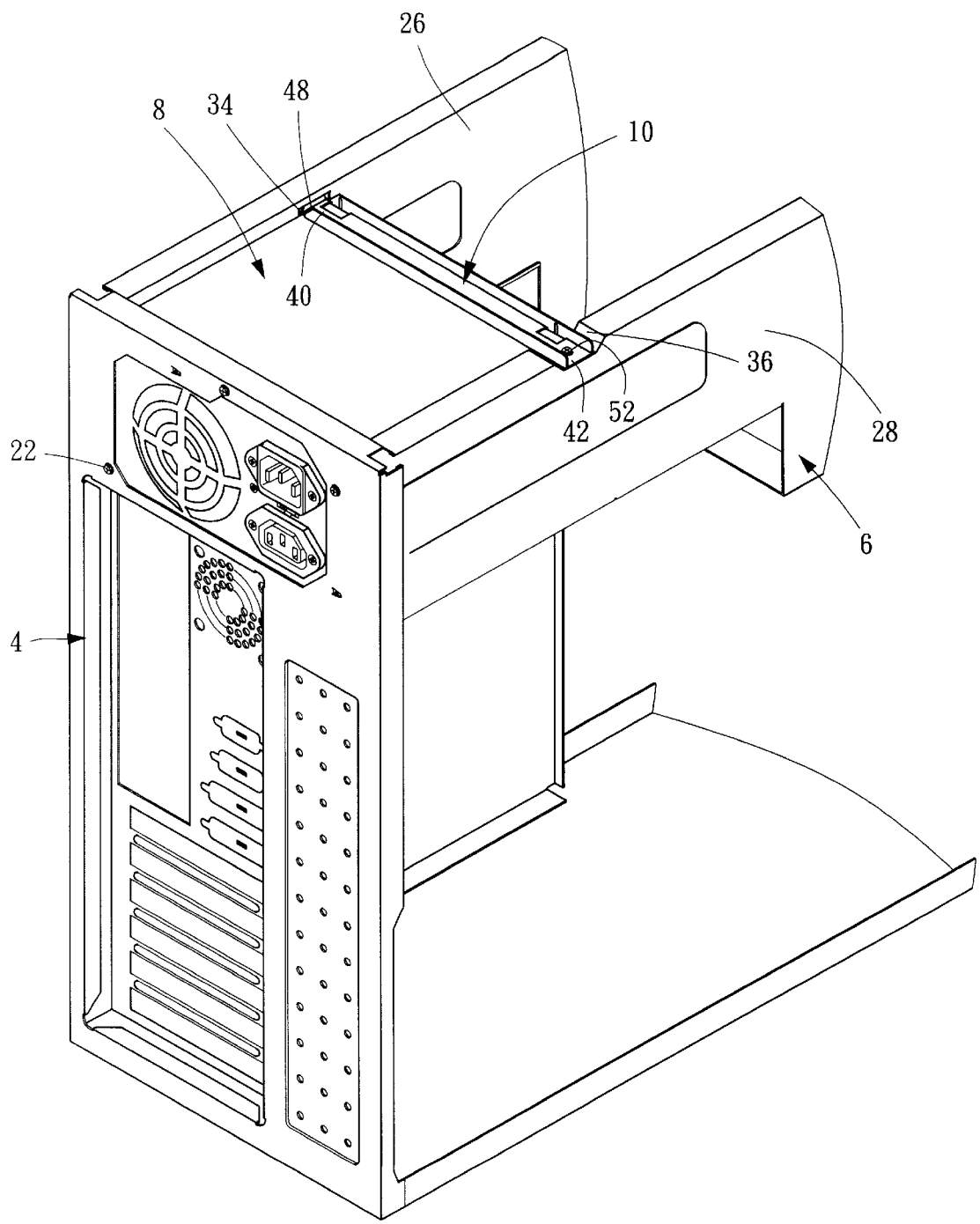
FIG. 5 is an assembled view of FIG. 2.

Referring to FIGS. 4 and 5, in assembly, the power supply 8 is received in the receiving space 32 of the fixing bracket 6. The rear wall 12 of the power supply 8 is exposed to the opening 16 of the rear panel 4 and the latches 24 of the rear panel 4 engage with the corresponding holes 14 (FIG. 2). The tongue 48 of the bridge 10 is inserted into the slot 34 of the first side wall 26. Then the bridge 10 is pivoted about the slot 34 so that the recess 36 of the second side wall 28 receives the second end 42 of the bridge 10 with the fingers 44 thereof abutting against a front surface (not labeled) of the power supply 8. The bolt 52 extends through the aperture 50 in the second end 42 and threadedly engages with the threaded aperture 38 in the second side wall 28 whereby the power supply 8 is fastened by the bridge 10. Three bolts 22 extend through the holes 20 of the rear panel 4 and threadedly engage with the corresponding threaded holes 14 of the power supply 8 for securing the power supply 8. Thus, the power supply 8 is easily assembled in the computer enclosure 2.

Additionally, the connections formed by the bolts 22, latches 24 and bridge 10 between the power supply 8 and the computer enclosure 2 provide for reliable electrostatic discharge.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A computer enclosure comprising:
    a rear panel;
    a fixing bracket attached to the rear panel, the fixing bracketcomprising first and second side walls opposie each other to define a receiving space therebetween adapted to receive an electronic device therein, a recess being defined in a top edge of the second side wall; and
    a bridge mounted to the fixing bracket for positioning and fastening the electronic device and comprising first and second ends respectively connected to the first and second side walls of the fixing bracket, the second end being received in the recess of the second side wall of the fixing bracket.

2. The computer enclosure as described in claim 1, wherein a supporting flange is formed at a bottom edge of each side wall of the fixing bracket for supporting the electronic device, and wherein the receiving space is defined by the supporting flanges and the side walls.

3. The computer enclosure as described in claim 1, wherein a slot is defined in the first side wall of the fixing bracket for receiving the first end of the bridge.

4. The computer enclosure as described in claim 1, wherein an aperture is defined in the second end of the bridge, and wherein a corresponding threaded aperture is defined in the recess of the second side wall for receiving a bolt therethrough, the bolt extending through the aperture in the second end of the bridge and threadedly engaging with he threaded aperture of the second side wall thereby securing the second end of the bridge in the recess of the second side wall.

5. The computer enclosure as described in claim 1, wherein a pair of longitudinal ribs is formed along opposite edges of the bridge for reinforcement.

6. The computer enclosure as described in claim 1, wherein at least one finger is formed downwardly from the bridge for properly positioning the electronic device.

7. The computer enclosure as described in claim 1, wherein a plurality of latches is formed on the rear panel and extends toward the receiving space for engaging with corresponding holes of the electronic device.

8. The computer enclosure as described in claim 1, wherein a plurality of holes is defined in the rear panel for receiving a plurality of bolts therethrough, the bolts threadedly engaging with corresponding threaded holes defined in the electronic device.

9. The computer enclosure as described in claim 2, wherein the rear panel forms a step substantially aligned with the supporting flanges for supporting the electronic device.

10. The computer enclosure as described in claim 3, wherein a tongue extends upwardly from the first end of the bridge for engaging with the slot of the first side wall.

11. A computer enclosure assembly comprising:
    a rear panel;
    a fixing bracket attached to the rear panel, the fixing bracket comprising first and second side walls opposite to each other;
    a pair of supporting flanges formed respectively on bottom edges of the first and second side walls;
    a bridge connected between said first and second side walls; and
    a power supply snugly received within a space defined among the first and second side walls, the pair of supporting flanges and the bridge; wherein
    said pair of supporting flanges extend forward to a distance in compliance with a longitudinal dimension of said power supply.

12. The assembly as described in claim 11, wherein a length of said supporting flange is generally equal to said longitudinal dimension of said power supply.

13. A computer enclosure comprising:
    a rear panel;
    a fixing bracket attached to the rear panel, the fixing bracket comprising first and second side walls opposie each other to define a receiving space therebetween adapted to receive an electronic device therein; and
    a bridge mounted to the fixing bracket for positioning and fastening the electronic device and comprising first and second ends respectively connected to the first and second side walls of the fixing bracket; wherein
    a pair of longitudinal ribs is formed along opposite edges of the bridge for reinforcement.

14. A computer enclosure comprising:
    a rear panel;
    a fixing bracket attached to the rear panel, the fixing bracketcomprising first and second side walls opposie each other to define a receiving space therebetween adapted to receive an electronic device therein; and
    a bridge mounted to the fixing bracket for positioning and fastening the electronic device and comprising first and second ends respectively connected to the first and second side walls of the fixing bracket; wherein
    at least one finger is formed downwardly from the bridge for properly positioning the electronic device.

* * * * *